United States Patent Office 3,846,071
Patented Nov. 5, 1974

3,846,071
PROCESS OF INHIBITING CORROSION BY TREATMENT WITH PHOSPHATE-CYCLIC AMIDINE SALTS
Derek Redmore, Ballwin, Mo., assignor to Petrolite Corporation, Wilmington, Del.
No Drawing. Original application Feb. 12, 1969, Ser. No. 798,789. Divided and this application Jan. 21, 1972, Ser. No. 219,832
Int. Cl. C23f 11/14, 11/16
U.S. Cl. 21—2.7 A                   10 Claims

ABSTRACT OF THE DISCLOSURE

A cyclic amidine salt, where the salt moiety is an acidic phosphate ester of an oxyalkylated alcohol, either employed alone or in conjunction with a carboxylic acid, i.e. a binary cyclic amidine-oxyalkylated phosphate salt or a tertiary cyclic amidine-oxyalkylated phosphate-carboxylate salt; and to uses for these salts particularly as corrosion inhibitors.

---

Division of Ser. No. 798,789, filed Feb. 12, 1969.

This invention relates to a cyclic amidine salt, where the salt moiety is an acidic phosphate ester of an oxyalkylated alcohol, either employed alone or in conjunction with a carboxylic acid, i.e. a binary cyclic amidine-oxyalkylated phosphate salt or a tertiary cyclic amidine-oxyalkylated phosphate-carboxylate salt; and to uses for these salts particularly as corrosion inhibitors.

The phosphate ester may be ideally presented as follows:

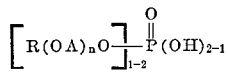

where R is an alcohol moiety for example hydrocarbon such as alkyl, alkenyl, aryl, alkaryl, aralkyl, etc., $(OA)_n$ is derived from an alkylene oxide or a plurality of alkylene oxides so as to yield homo, block, hetero, etc. units and $n$ is a number determined by the components of the system such as the type and number of carbons in R, the type and number of moles of alkylene oxides employed, etc.; the operational system in which it is employed, etc. For example, $n$ is 1–100 or more, such as 1–50, for example, 2–25, but preferably 2 to 10.

The cyclic amidine may be ideally represented by the following idealized formula:

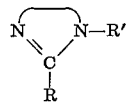

where R—C is the moiety derived from the carboxylic acid or equivalent and R' is the moiety derived from the polyamine; R' is a hydrocarbon such as alkyl, alkenyl, aryl, alkaryl, aralkyl, etc.

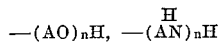

acylated derivatives thereof, etc. Also included within the term "cyclic amidine" are those of the following type:

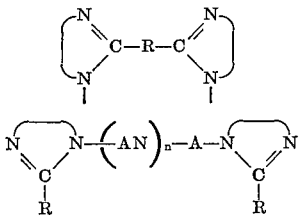

polymers having cyclic amidines within the main chain as illustrated in U.S. Patent Application Ser. No. 502,636, filed Oct. 22, 1965, now U.S. Pat. No. 3,531,496 and U.S. Application Ser. No. 442,793, filed Mar. 25, 1965, now U.S. Pat. No. 3,445,441, and polymers having dangling cyclic amidine groups as illustrated in U.S. Patent Application 520,833 filed Jan. 17, 1966, now U.S. Pat. No. 3,488,294, for example, of the general formula

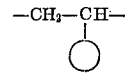

where

is a pendant cyclic amidine group.

CYCLIC AMIDINE

The expression "cyclic amidine" is employed in its usual sense to indicate ring compounds in which ring there are present either 5 or 6 members, and having 2 nitrogen atoms separated by a single carbon atom supplemented by either two or three additional carbon atoms to complete the ring. All the carbon atoms and that nitrogen atom of the ring involving two monovalent linkages may be substituted. Needless to say, these compounds include members in which the substituents also may have one or more nitrogen atoms, either in the form of amino nitrogen atoms or in the form of acylated nitrogen atoms.

These cyclic amidines are further characterized as being substituted imidazoline and tetrahydropyrimidines in which the 2-position carbon of the ring is generally bonded to a hydrocarbon radical or comparable radical derived from an acid, such as a low molal fatty acid, a high molal fatty acid, or comparable acid, polycarboxy acid and the like.

For details of the preparation of imidazolines, substituted in the 2-position, from amines, see the following U.S. Patents: U.S. No. 1,999,989, dated Apr. 30, 1935, Max Bockmuhl et al.; U.S. No. 2,155,877, dated Apr. 25, 1939, Edmund Waldmann et al.; and U.S. No. 2,155,878, dated Apr. 25, 1939, Edmund Waldmann et al. Also see Chem. Rev. 32, 47 (43), and Chem. Rev. 54, 593 (54).

Equally suitable for use in preparing compounds useful in my invention and for the preparation of tetrahydropyrimidines substituted in the 2-position are the polyamines containing at least one primary amino group and at least one secondary amino group, or another primary amino group separated from the first amino group by three carbon atoms instead of being separated by only 2 carbons as with imidazolines. This reaction, as in the case of the imidazolines, is generally carried out by heating the reactants to a temperature at which 2 moles of water are evolved per mole of carboxylic group and ring closure is effected. For details of the preparation of tetrahydropyrimidines, see German Pat. No. 700,371 and U.S. Pat. No. 2,194,419.

Substituted imidazolines and tetrahydropyrimidines are obtained from a variety of acids beginning with the one-carbon acid (formic) through and including higher fatty acids or the equivalent having as many as 32 or more carbon atoms, for example, from 8–22 carbons. Modified fatty acids also can be employed, as for example, phenylstearic acid or the like. Cyclic acids may be employed, including naphthenic acids. A variety of other acids including benzoic acid, substituted benzoic acid, alicyclic acids, and the like, have been employed to furnish the residue

from the acid RCOOH in which the C of the residue

is part of the ring. The fatty acids employed, for example, may be saturated or unsaturated. Branched long-chain fatty acids may be employed. See J. Am. Chem. Soc. 74, 2523 (1952). This applies also to the lower-molecular-weight acids as well.

Among sources of such acids may be mentioned straight-chain and branched-chain, saturated and unsaturated, aliphatic, cycloaliphatic, aromatic, hydroaromatic, aralkyl acids, etc.

Examples of saturated aliphatic monocarboxylic acids comprise: acetic, propionic, butyric, valeric, caproic, heptanoic, caprylic, nonanoic, capric, undecanoic, lauric, tridecanoic, myristic, pentadecanoic, palmitic, heptadecanoic, stearic, nondecanoic, eicosanoic, hencicosanoic, dodosanoic, triconsanoic, tetracosanoic, pentacosanoic, cerotic, heptacosanoic, montanic, nonacosanoic, melissic and the like.

Examples of ethylene unsaturated aliphatic acids comprise: acrylic, methacrylic, crotonic, anglic, tiglic, the pentenoic acids, the hexenoic acids, for example, hydrosorbic acid, the heptenoic acids, the octenoic acids, nonenoic acids, the decenoic acids, for example, obtusilic acid, the undecenoic acids, the dodencenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elaidic acid, the nonadecenoic acids, for example, the eicosenoic acids, the docosenoic acids, for example, erucic acid, brassidic acid, cetoleic acid, the tetracosenic acids, and the like.

Examples of dienoic acids comprise the pentadienoic acids, the hexadienoic acids, for example, sorbic acid, the octadienoic acids, for example, linoleic, and the like.

Examples of the trienoic acids comprise the octadecatrienoic acids, for example, linolenic acid, eleostearic acid, pseudo-eleostearic acid, and the like.

Carboxylic acids containing functional groups such as hydroxy groups can be employed. Hydroxy acids, particularly the alpha-hydroxy acids, comprise glycolic acid, lactic acid, the hydroxyvaleric acids, the hydroxycaproic acids, the hydroxyheptanoic acids, the hydroxycaprylic acids, the hydroxynonanoic acids, the hydroxycapric acids, the hydroxydecanoic acids, the hydroxylauric acids, the hydroxytridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelaidic acid, hydroxyoctadecynoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids comprise ricinoleyllactic acid, acetylricinoleic acid, chloroacetylricinoleic acid, and the like.

Examples of the cyclic aliphatic carboxylic acids comprise those found in petroleum called naphthenic acids, hydnocarpic and chaulmoogric acids, cyclopentane carboxylic acids, cyclohexanecarboxylic acid, campholic acid, fencholic acids, and the like.

Examples of aromatic monocarboxylic acids comprise benzoic acid, substituted benzoic acids, for example, the toluic acids, the xylenoic acids, alkoxybenzoic acid, phenylbenzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soybean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acids; aralkyl and aromatic acids, such as Twitchell fatty acids, naphthoic acid, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids comprise those of the aliphatic series, for example, oxalic, malonic, succinic, glutaric, adipic, pimelic, suberic, azelaic, sebacic, nonanedicarboxylic acid, decanedcarboxylic acids, undecanedicarboxylic acids, and the like.

Examples of unsaturated aliphatic polycarboxylic acids comprise fumaric, maleic, mesoconic, citraconic, glutonic, itaconic, muconic, aconitric acids, and the like.

Examples of aromatic polycarboxylic acids comprise isophthalic acids, terephthalic acids, substituted derivatives thereof, (e.g. alkyl, chloro, alkoxy, etc. derivatives), biphenyldicarboxylic acid, diphenylether dicarboxylic acids, diphenylsulfone dicarboxylic acids and the like.

Other polycarboxylic acids comprise the dimeric, trimeric and poly acids, for example, the Emery Industries polymeric acids such as those described in U.S. Pat. 2,763,612, and the like. Other polycarboxylic acids comprise those containing ether groups, for example, diglycolic acid. Mixtures of the above acids can be advantageously employed.

In addition, acid precursors such as esters, acid chlorides, glycerides, etc., can be employed in place of the free acid in calculating the stoichiometry of acylating the hydroxaliphatic cyclic amidines.

Thus, cyclic amidines within the scope of this invention comprise compounds of the formulae:

(1) 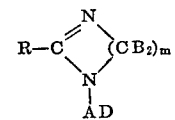

(2) 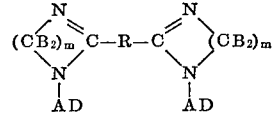

(3) 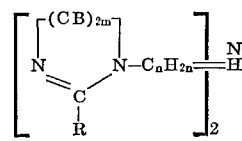

where

and

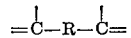

are the residues derived from the carboxylic acid, for example, any of those mentioned above, such as where R is a hydrocarbon radical having, for example, 1–30 carbons or more, a saturated or unsaturated aliphatic radical, a cycloaliphatic radical, an aryl radical, an aralkyl radical, an alkaryl radical, an alkoxyalkyl radical, an aryloxyalkyl radical and the like, $m$ is 2, or 3, B is hydrogen or a hydrocarbon radical, for example, a lower alkyl radical, i.e., $(CB_2)_n$, can be a divalent radical having 2 or 3 carbons in its main chain, for example, a divalent radical of the formula $$-CH_2-CH_2-, \quad -CH_2-CH_2-CH_2-,$$

$$-CH-CH_2$$
$$\quad\;|$$
$$\quad CH_3$$

$$-CH-CH-$$
$$\;|\quad\;|$$
$$CH_3\;CH_3$$

$$-CH_2-CH-CH_2-$$
$$\qquad\;|$$
$$\qquad CH_3$$

etc.; and AD is hydrogen or the residue of the polyamine wherein A is, for example, $$-C_nH_{2n}-NR-;$$

$$-C_nH_{2n}-C-; \quad -C_nH_{2n}O-C-$$
$$\qquad\;\|\qquad\qquad\qquad\;\|$$
$$\qquad O\qquad\qquad\qquad\; O$$

$$-C_nH_{2n}-O-; \quad -C_nH_{2n}-NR'-C_nH_{2n}-NR'-$$

$$-C_nH_{2n}-NR'-C_nH_{2n}-NR'-C_nH_{2n}-NR'-$$

$$-C_nH_{2n}-N\diagdown\!\!\diagup^{R}_{N}\diagup^{C}_{\diagdown}$$
$$\qquad\qquad(CB_2)^+$$

etc., and D and R' are hydrogen or a hydrocarbon radical, for example, aliphatic, cycloaliphatic, etc., and $n$ is a whole number, for example, 1–6, but preferably 2 or 3. Any suitable cyclic-amidine-forming polyamine can be employed. Examples of suitable polyamines employed in preparing cyclic amidines comprise ethylene diamine, diethylene triamine, triethylene tetramine, tetraethylene pentamine, 1,2-diaminopropane, N-ethyl ethylene diamine, N,N-dibutyl diethylene triamine 1,2-diaminobutane, hydroxyethyl ethylene diamine, etc. Cyclic-amidine-forming amines are well known and have been described, for example, in the above patents and publications.

The preferred class of cyclic amidines comprises imidazolines of the formula:

$$R-C\diagdown\!\!\diagup^{N}_{N}$$
$$\qquad\;|$$
$$\quad(C_2H_4NR')_mR'$$

where R is a hydrocarbon group having 8–32 carbon atoms, R' is hydrogen or a hydrocarbon radical, but preferably hydrogen and $m$ is a small number, usually less than 6, but preferably 1–3.

Examples and the preparation of suitable imidazolines can be found in U.S. Reissue Pat. 23,227 and suitable tetrahydropyrimidines in U.S. Pat. 2,640,029. The cyclic amidines of the present invention are prepared in a similar manner.

From a practical standpoint, however, the most readily available polyamines are diethylene triamine, triethylene tetramine, and tetraethylene pentamine. No particular advantage has been found in using other polyamines in which some other divalent radical such as $$\quad H\;CH_3$$
$$\quad|\quad\;|$$
$$-C-C-$$
$$\quad|\quad\;|$$
$$\quad H\quad H$$

is used.

The phosphates of this invention are prepared from suitable oxyalkylated alcohols. Thus, alcohols of the formulae ROH are oxyalkylated by any suitable alkylene oxide or combination thereof to yield oxyalkylated alcohols of the formula $R(OA)_nOH$ which are then reacted with phosphoric acid or its equivalent to yield the phosphate ester of the general formula $$\qquad\qquad O$$
$$\qquad\qquad\|$$
$$[R(OA)_nO]_{1-2}P(OH)_{2-1}$$

When an alcohol ROH is oxyalkylated it yields produces having $-(OA)_n$ units attached to the base oxyalkylatable unit, i.e. $R(OA)_nOH$.

$(OA)_n$ is derived from any suitable $\alpha,\beta$ alkylene oxide, for example, alkylene oxides of the formula $$\qquad\quad R^1\quad\;R^3$$
$$\qquad\quad|\quad\;\;|$$
$$R^2-C-----C-R^4$$
$$\qquad\;\diagdown\!\!\diagup$$
$$\qquad\quad O$$

where $R^1$, $R^2$, $R^3$, $R^4$ are hydrogen or a substituted group, such as alkyl, cycloalkyl, aryl, etc., for example ethylene oxide, propylene oxide, butylene oxide, amylene oxide, octylene oxide, styrene oxide, methylstyrene oxide, cyclohexene oxide (where $R^1$ and $R^3$ are joined to form a ring), etc.

Equivalents of alkylene oxides can also be employed, for example alkylene carbonates, i.e. ethylene carbonate, propylene carbonate, butylene carbonate, etc. In addition alkylene oxides of the glycide, methyl glycide, etc. type and their equivalents can also be employed.

$(OA)_n$ denotes (1) homo units for example $$-(OEt)_n-,$$

$$-(OPr)_n-, \quad -(OBu)_n-, \quad -(O\;Octyl)_n-,$$

$$-(O-CHCH_2)_n-,$$
$$\qquad\;|$$
$$\qquad\bigcirc$$

etc., (2) block units, $-(OEt)_a(OPr)_b-$, $$-(OEt)_a(OBu)_b-,$$

$$-(OPr)_2(OEt)_b(OPr)_c-, \quad -(OEt)_a(OPr)_b(OBu)_c-,$$

$$-(OEt)_a(OCHCH_2)_b-$$

etc. where $a+b+c=n$; (3) hetero units containing random mixtures of more than one oxide $(Oet-OPr)_n$, $$(OPr-OBu)_n,$$

$(OEt-OBu)_n$, wherein the ratio of each oxide to the other is for example 1–99 to 99–1; (4) hetero-homo units for example $(EtO)_a(EtO-PrO)_b$, $$(EtO)_a(PrO)_b(EtO-PrO)_c,$$

$(EtO-PrO)_a(BuO)_b$, etc. $n$ is an integer of about 1–150 or more but preferably from about 2 to 10.

In addition, derivatives of $(OA)_n$ can be derived from an oxetane (e.g. $\alpha$-$\gamma$ alkylene oxides) for example those of the formula $$\qquad\quad B$$
$$\qquad\quad|$$
$$\qquad\quad C$$
$$\qquad\diagup\;|\;\diagdown$$
$$CH_2\;D\;CH_2$$
$$\quad\diagdown\quad\;\diagup$$
$$\qquad\;O$$

where B and D are hydrogen or a substituted radical, for example alkyl, aryl, cycloalkyl, alkenyl, aralkyl, etc.

These oxyalkylated alcohols are reacted with phosphoric acid, polyphosphoric acid, or their equivalents to form the ester.

The simplest phosphorylating reagent which can be used is orthophosphoric acid but this requires vigorous conditions to bring about reaction. The products from this reagent are mainly monoesters $$\qquad\qquad O$$
$$\qquad\qquad\|$$
$$R(OA)_nOP(OH)_2.$$

Reagents which are generally preferred as phosphorylating reagents are anhydrides, partial anhydrides, and acid halides of phosphoric acid. These reagents require much milder conditions than orthophosphoric acid since they are highly reactive and furthermore give much better yields of the required products. The exact reagent of choice will depend on the individual hydroxy-compound to be reacted and on the structure of the product required. For example, phosphorus pentoxide is a powerful phosphorylating reagent which on reaction with a hydroxy-compound yields a mixture of mono- and di-esters,

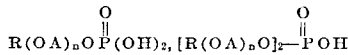

The ratio of mono to di-ester depends on the ratio of hydroxy compound to phosphorus pentoxide reacted.

Polyphosphoric acid is intermediate in behavior between orthophosphoric acid and phosphorus pentoxide since it is a partial anhydride of phosphoric acid. This reagent is particularly useful in preparing monoesters of phosphoric acid. For example, on reacting equimolar amounts of polyphosphoric and a hydroxy compound the main product is the monoester

Another very important group of phosphorylating reagents which are used to prepare the products of this invention are acid halides of phosphoric acid. Among these are phosphoryl halides, $POX_3$ ($X=Cl, Br$), phosphorochloridates,

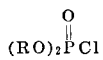

(where R is alkyl, cycloalkyl, aryl, heterocyclic), phosphorodichloridates,

(where R is as defined above). For example, a phosphorochloridate can be reacted with a hydroxy-compound to give a triester as follows:

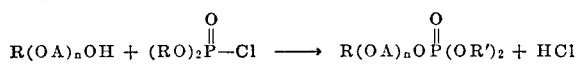

R is as defined above.

Other methods for phosphorylation are known and can be found described in "Structure and Mechanism in Organo-Phosphorus Chemistry" p. 250–280 by R. F. Hudson, Academic Press 1965, F. Cramer, in New Methods of Preparative Organic Chemistry, vol. III, p. 319–356, Ed. W. Foerst, Academic Press 1964.

The following examples are presented for purposes of illustration and not of limitation,

TABLE 1

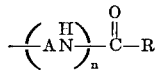

| Ex. | R | n | R' | R'' | x | y | Wt. ratio, amidine/ phosphate |
|---|---|---|---|---|---|---|---|
| 1 | $C_{17}H_{33}$ | 1 | $C_{14}H_{29}$ | H | 4.6 | 1 | 1.5 |
| 2 | $C_{17}H_{33}$ | 1 | $C_{14}H_{29}$ | H | 4.6 | 1 | 2.8 |
| 3 | $C_{17}H_{33}$ | 2 | $C_{14}H_{29}$ | H | 4.0 | 1 | 2.0 |
| 4 | $C_{17}H_{33}$ | 2 | $C_{14}H_{29}$ | H | 4.0 | 1 | 3.0 |
| 5 | $C_{17}H_{33}$ | 1 | $C_{14}H_{29}$ | H | 4.6 | 2 | 1.5 |
| 6 | $C_{17}H_{33}$ | 1 | $C_{14}H_{29}$ | H | 4.6 | 2 | 2.8 |
| 7 | $C_{17}H_{33}$ | 1 | $C_{8-10}$ mixture | H | 3.2 | 1 | 2.5 |
| 8 | $C_{17}H_{33}$ | 1 | do | H | 3.2 | 1 | 1.8 |
| 9 | $C_{17}H_{33}$ | 1 | do | H | 2.4 | 1 | 2.4 |
| 10 | $C_{17}H_{33}$ | 2 | do | H | 2.4 | 1 | 2.4 |
| 11 | $C_{11}H_{23}$ | 1 | $C_{14}H_{29}$ | H | 4.6 | 1 | 2.0 |
| 12 | $C_{11}H_{23}$ | 1 | p-Nonyl phenyl | H | 4.0 | 1 | 2.0 |
| 13 | $C_{11}H_{23}$ | 1 | do | H | 4.0 | 2 | 2.0 |
| 14 | $C_{17}H_{35}$ | 1 | do | H | 4.0 | 1 | 2.4 |
| 15 | $C_{17}H_{35}$ | (¹) | do | H | 4.0 | 1 | 2.0 |

¹ Mixture 1, 2 and 3.

It is to be noted that the cyclic amidine has an amino-containing chain. This side chain may be employed in an unmodified form, i.e.

or may be modified by further reaction such as by acylation or the like, i.e.

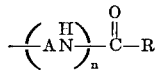

where R is the moiety of a carboxylic acid, for example any of those employed in preparing the cyclic amidine.

These are illustrated by the following examples:

TABLE II

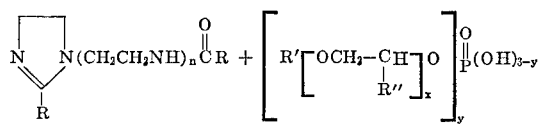

| Ex. | R | n | R' | R'' | x | y | Wt. ratio, imidazoline/phosphate |
|---|---|---|---|---|---|---|---|
| 16 | $C_{17}H_{33}$ | 1 | $C_{14}H_{29}$ | H | 4.6 | 1 | 2.0 |
| 17 | $C_{17}H_{33}$ | 2 | $C_{11}H_{23}$ | H | 4.6 | 1 | 2.4 |
| 18 | $C_{17}H_{33}$ | 1 | $C_{14}H_{29}$ | H | 4.6 | 2 | 2.0 |
| 19 | $C_{11}H_{23}$ | 1 | $C_{14}H_{29}$ | H | 4.6 | 1 | 1.8 |
| 20 | $C_{11}H_{23}$ | 1 | $C_{14}H_{29}$† | H | 4.6 | 2 | 2.0 |
| 21 | $C_{11}H_{23}$ | 2 | p-Nonylphenyl | H | 4.0 | 1 | 2.0 |
| 22 | $C_{17}H_{35}$ | 1 | $C_{14}H_{29}$ | H | 4.6 | 1 | 2.0 |
| 23 | $C_{17}H_{35}$ | 1 | $C_{14}H_{29}$ | H | 4.6 | 2 | 2.0 |
| 24 | $C_{17}H_{35}$ | (¹) | p-Nonylphenyl | H | 4.0 | 1 | 2.4 |
| 25 | $C_{17}H_{35}$ | (¹) | do | H | 4.0 | 2 | 2.4 |
| 26 | $C_{17}H_{33}$ | 1 | $C_{8-10}$ mixture | $CH_3$ | 2.0 | 2 | 2.0 |
| 27 | $C_{17}H_{33}$ | 1 | do | $CH_3$ | 2.0 | 2 | 3.0 |
| 28 | $C_{17}H_{33}$ | 2 | do | $CH_3$ | 2.0 | 2 | 2.4 |

¹ Mixture 1, 2 and 3.

The molar ratio of phosphate to cyclic amidine may vary widely. However, in practice one employs a molar ratio of from about 0.1 to 5.0 or more, such as from about 0.2 to 2.0 for example from about 0.25 to 1.0. Optimum corrosion inhibition is achieved at a molar ratio of about 0.5±0.25.

In addition part of the phosphate moiety may be replaced with other acids such as carboxylic acid, for example, those employed in preparing the cyclic amidines, in ratios that do not subtract substantially from the function of the compound. Thus, for example, one-half of the above molar ratio may be replaced with a carboxylic acid such as from ⅓ to ¼ of the molar ratio. Stated another way, these are mixed cyclid amidine-phosphate-carboxylate salts. Any of the carboxylic acid employed in making the cyclic amidine can be employed as the carboxylate moiety. The molar ratio of cyclic amidine-phosphate-carboxylate may be for example from about 1 to 10, 1 to 10, 80 to 5, but preferably from about 1 to 5, 1 to 4, 0 to 3.

USE AS CORROSION INHIBITOR

More specifically, this phase of the invention relates to the inhibition of corrosion in the petroleum industry with specific reference to producing wells, pipe lines, refineries, tank storage, etc.

The use of a corrosion inhibiting agent in the oil industry and other industries, and particularly for the protection of ferrous metals, is well known. For example, see U.S. Pats. Nos. 2,736,658, dated Feb. 28, 1954, to Pfohl et al., and 2,756,211, dated July 24, 1956, to Jones, and 2,727,003, dated Dec. 13, 1955, to Hughes.

More specifically then, and particularly from the standpoint of oil production, this aspect of the invention relates to inhibiting corrosion caused by hydrogen sulfide, carbon dioxide, inorganic and organic acids, combinations of each with oxygen, and with each other and oxygen. More particularly, it relates to treating wells to mitigate metal corrosion and associated difficulties.

It should also be pointed out that the corrosiveness of oil well brines will vary from well to well, and the proportion of corrosion inhibiting agent added to the well fluids should also be varied from well to well. Thus, in some wells it is possible to effectively control corrosion by the addition of as little as 5 p.p.m. of my new compositions to the well fluids, whereas in other wells, it is necessary to add 200 p.p.m. or more.

In using my improved compositions for protecting oil well tubing, casing and other equipment which comes in contact with the corrosive oil-brine production, I find that excellent results may be obtained by injecting an appropriate quantity of a selected composition into a producing well so that it mingles with the oil brine mixture and comes into contact with the casing, tubing, pumps and other producing equipment. I can, for example, introduce the inhibiting composition into the top of the casing, thus causing it to flow down into the well and thence back through the tubing, etc. In general, I have found that this procedure suffices to inhibit corrosion throughout the entire system of production, and collection, even including field tankage.

In case serious emulsion or gel problems are encountered, demulsifiers are advantageously added. This is important not only to avoid the troublesome emulsions and gels themselves, but also to improve corrosion inhibition. The explanation of less effective corrosion inhibition in the presence of emulsions apparently is that the inhibitor is somewhat surface-active. That is, it is concentrated at interfacial surfaces. Since this surface is great in an emulsion, most of the inhibitor will be concentrated in these interfaces and little will remain in the body of the oil for deposition on the metal surfaces. In many wells, oil-in-water type emulsions often occur naturally. In such wells the inhibitors herein described tending to form water-in-oil emulsions, often decreases the emulsion problems naturally present. Thus, in addition to being effective corrosion inhibitors, the herein described products tend to eliminate emulsion problems which sometimes appear when some of the present day inhibitors are used in oil wells or refinery processing.

The method of carrying out my process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, inorganic and organic acids, $O_2$ and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all well-head fittings, connections and flow lines handling the corrosive fluid.

Where the inhibitor composition is a liquid, it is conventionally fed into the well annulus of a motor driven chemical injector pump, or it may be dumped periodically (e.g. once every day or two) into the annulus by means of a so-called "boll weevil" device or similar arrangement. Where the inhibitor is a solid, it is dropped into the well as a solid lump or stick, blown in as powder with gas, or washed in with a smallstream of the wall fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. This results, for example, when the tubing is surrounded at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosene, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid "sticks" or plugs of inhibitor is especially convenient. These are prepared by blending the inhibitor with a mineral wax, asphalt or resin in a proportion sufficient to give a moderately hard and high-melting solid which can be handled and fed into the well conveniently.

The amount of corrosion preventive agent required in my process varies with the corrosiveness of the system, but where a continuous or semi-continuous treating procedure is carried out as described above, the addition of reagent in the proportion of from 5 parts per million to 1000 parts per million or more parts of corrosive fluid will generally provide protection.

These corrosion inhibitors can be used in combination with other well-known corrosion inhibitors, for example, the cyclic amidine structures, the amido cyclic amidine structures, and the amino cyclic amidine structures, as disclosed in the Blair and Gross Reissue Pat. No. 23,227.

As pointed out previously, the addition of corrosion inhibitors, particularly in the form of a solution by means of a metering pump or the like, is common practice. The particular corrosion inhibitors herein described are applied in the same manner as other corrosion inhibitors intended for use for the same purpose. As to the use of the corrosion inhibitor, a solution of it can be prepared in a suitable solvent such as mineral oil, methyl ethyl ketone, xylene, kerosene, high boiling aromatic solvent, or even water.

The following examples are presented to illustrate the superiority of the instant compounds as corrosion inhibitors.

EXAMPLES

These tests were run under conditions so set up as to simulate those found in an actual producing well. The test procedure involved the measurement of the corrosive action of fluids inhibited by the compositions herein described upon sandblasted SAE 1020 steel coupons measuring ¼ inch in diameter and being 4 inches long when compared to test coupons containing no inhibitor and commercial inhibitors.

Clean pint bottles were half-filled (almost 200 ml.) with sea-water (i.e., tap water containing 3% by weight of the salts magnesium chloride, calcium chloride, sodium sulfate and sodium chloride) which had been saturated with carbon dioxide. Those requiring inhibitor were charged with the same by pipetting calculated amounts contained in suitable solvents (water, isopropyl alcohol, mineral spirits) to give the required parts per million of inhibitor. Uninhibited blanks were run in conjunction with inhibited solutions. The bottles were now filled (total volume now about 400 ml.) leaving a small air space to allow for expansion. The weighed coupons attached to sealing caps were screwed onto the bottles and they were placed on a rotating wheel for 48 hours at 115° F. The coupons were then removed, cleaned electrolytically in 5% sulfuric acid (using the coupons as a cathode) and washed successively with dilute sodium hydroxide, twice with water, once with acetone and finally dried.

When the inhibitor was oil-soluble as contrasted to water-soluble, a two-phase system was used instead of the "all-brine system" and this simply consisted of using carbon dioxide saturated mineral spirits to replace 25% by volume of the brine.

The changes in the weights of the coupons during the corrosion test were taken as a measurement of the effectiveness of the inhibitor compositions. Protective percentage was calculated for each test coupon taken from the inhibited fluids in accordance with the following formula:

$$\frac{W_1 - W_2}{W_1} \times 100 = \text{percent protection}$$

in which $W_1$ is the loss in weight of the coupon taken from uninhibited fluids and $W_2$ is the loss in weight of coupons which were subjected to inhibited fluids.

The results obtained are presented in the examples of the following Table which are exemplary of the performance of the present corrosion inhibitors as compared to the best commercial inhibitor for the corrosion system.

TABLE A

[Corrosion test data in $CO_2$ system]

| | Percent protecton of given p.p.m. of inhibitor | |
|---|---|---|
| | 10 p.p.m. | 30 p.p.m. |
| Example: | | |
| 2 | 79 | 91 |
| 16 | 79 | 88 |
| 6 | 70 | 84 |
| 18 | 85 | 91 |
| Best commercial compound currently employed | 43 | 70 |

In the preferred embodiment

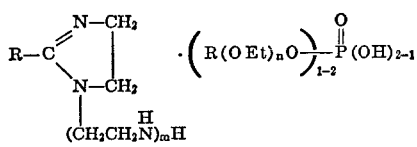

the R's have from about 8–20 carbons, $n$ is from about 1–20 units, and $m$ is from about 1–5 units.

As is quite evident, cyclicamidines, acidic oxyalkylated phosphates and carboxylic acids components other than those illustrated can be used in this invention. It is, therefore, not only impossible to attempt a comprehensive catalogue of such components, but to attempt to describe the invention in its broader aspects in terms of specific chemical names of its components used would be too voluminous and unnecessary since one skilled in the art could by following the description of the invention herein select useful components. This invention lies in the use of suitable components, particularly for use as corrosion inhibitors and their individual compositions are important only in the sense that their properties can affect this function. To precisely define each specific useful component in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability or specific components suitable for this invention by applying them in the process set forth herein. In analogy to the case of a machine, wherein the use of certain materials of construction or dimensions of parts would lead to no practical useful result, various materials will be rejected as inapplicable where others would be operative. One can obviously assume that no one will wish to employ a useless component nor will be misled because it is possible to misapply the teachings of the present disclosure to do so. Thus, any oxyalkylated phosphate-containing cyclic amidine salt that can perform the function stated herein can be employed.

OTHER USES

These products are effective not only as corrosion inhibitors but can be used for a member of other purposes. For instance, they are useful as asphalt additives to increase the adhesiveness of the asphalt to the mineral aggregates.

In addition, the present compounds have the following applications:

As demulsifiers and desalters for water-in-water emulsions; as demulsifiers for oil-in-water emulsions; as fuel oil additives for gasoline, diesel fuel, jet fuel, and the like; as lubricating oil additives; as scale preventatives; as chelating agents or to form chelates, which are themselves useful, for example, as anti-oxidants, fungicides; etc.; as flotation agents, for example, as flotation collection agents; as additives for compositions useful in acidizing calcareous strata of oil wells; as additives for treating water used in the secondary recovery of oil and in disposal wells; as additives used in treating oil-well strata in primary oil recovery to enhance the flow of oil; as emulsifiers for both oil-in-water and water-in-oil emulsions; as additives for slushing oils; as additives for cutting oils; as additives for oil to prevent emulsification during transport; as additives for drilling muds; as agents useful in removing mud sheaths from newly drilled wells; as dehazing or "fog-inhibiting" agents for fuels; as additives for preparing sand or mineral slurries useful in treating oil wells to enhance the recovery of oil; as agents for producing polymeric emulsions useful in preparing water-vapor impermeable paper board; as agents in paraffin solvents; as agents in preparing thickened silica aerogel lubricants; as gasoline anti-oxidant additives; as deicing agents for fuels; as antiseptic, preservative, bactericidal, bacteriostatic, germicidal, fungicidal agents; as agents for the textile industry, for example, as mercerizing assistants, as wetting agents, as rewetting agents, as dispersing agents, as detergents, as penetrating agents, as softening agents, as dyeing assistants, as anti-static agents, and the like; as additives for rubber latices; as an entraining agent for concrete and cements; as anti-static agents for rugs, floors, upholstery, plastic and wax polishes, textiles, etc.; as detergents useful in metal cleaners, in floor oils, in dry cleaning, in general cleaning, and the like; as agents useful in leather processes such as in flat liquoring, pickling, acid degreasing, dye fixing, and the like; as agents in metal pickling, as additives in paints for improved adhesion of primers, in preventing water-spotting in lacquer; as anti-skinners for pigment flushing, grinding and dispersing; as anti-feathering agents in ink; as agents in the preparation of wood pulp and pulp slurries; as emulsifiers for insecticidal compositions and agricultural sprays such as DT, 24–D (Toxaphene), chlordan, nicotine sulfate, hexachlorocyclohexane, and the like; as agents useful in building materials, for example, in the water repellent treatment of plaster, concrete, cement, roofing materials, floor sealers; as additive in bonding agents for various insulating building materials; and the like.

Having thus described my invention, what I claim as new and desire to obtain by Letters Patent is:

1. A process of inhibiting corrosion which comprises treating a corrosion system with an imidazoline salt where the salt moiety is an acidic phosphate ester of an oxyalkylated alcohol employed alone or in conjunction with a carboxylic acid.

2. The process of Claim 1 where the imidazoline has an amino side chain.

3. The process of Claim 2 where the phosphate moiety is

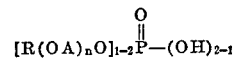

where R is a hydrocarbon group, $(OA)_n$ is a moiety derived from an alkylene oxide and $n$ is an integer.

4. The process of Claim 3 where the phosphate is the sole acidic moiety.

5. The process of Claim 2 where the side amino group is acylated.

6. The process of Claim 5 where the phosphate moiety is $$[R(OA)_nO]_{1-2}\overset{O}{\underset{\|}{P}}-(OH)_{3-1}$$

where R is a hydrocarbon group, OA is a moiety derived from an alkylene oxide, and $n$ is an integer.

7. The process of Claim 6 where the phosphate is the sole acidic moiety.

8. The process of Claim 7 where the imidazoline is

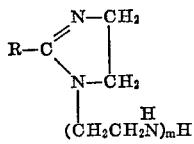

and the phosphate moiety is $$[R(OEt)_nO]_{1-2}\overset{O}{\underset{\|}{P}}(OH)_{1-2}$$

where the R is from about 8 to 20 carbons and $n$ is from about 1 to 20 and $m$ is from about 1–5.

9. The process of Claim 8 where the amino side chain is acylated.

10. The process of Claim 8 where $m$ is 1, where R attached to

of the imidazoline is $C_{17}H_{33}$, the phosphate moiety is $$\left(R(OCH_2CH_2)_{3.2}O\right)\overset{O}{\underset{\|}{P}}(OH)_2,$$

R of said phosphate moiety being a mixture of $C_8H_{17}$ and $C_{10}H_{21}$, and the weight ratio of the imidazoline to the phosphate is 2.5.

References Cited
UNITED STATES PATENTS

| | | | |
|---|---|---|---|
| Re. 23,227 | 5/1950 | Blair et al. | 252—8.55 E |
| 3,422,166 | 1/1969 | Davis | 260—925 |
| 3,484,505 | 12/1969 | Cyba | 260—925 |

BENJAMIN R. PADGET, Primary Examiner

I. GLUCK, Assistant Examiner

U.S. Cl. X.R.

21—2.5 A; 106—14; 252—8.55 E, 389 A, 392; 260—309.6, 925